(12) United States Patent
Suzuki

(10) Patent No.: US 10,161,466 B2
(45) Date of Patent: Dec. 25, 2018

(54) BRAKE DEVICE

(71) Applicant: KYB Corporation, Tokyo (JP)

(72) Inventor: Tsutomu Suzuki, Kanagawa (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 15/556,780

(22) PCT Filed: Mar. 3, 2016

(86) PCT No.: PCT/JP2016/056639
§ 371 (c)(1),
(2) Date: Sep. 8, 2017

(87) PCT Pub. No.: WO2016/143671
PCT Pub. Date: Sep. 15, 2016

(65) Prior Publication Data
US 2018/0058527 A1 Mar. 1, 2018

(30) Foreign Application Priority Data

Mar. 11, 2015 (JP) .................. 2015-048618

(51) Int. Cl.
*F16D 65/56* (2006.01)
*B61H 5/00* (2006.01)
(Continued)

(52) U.S. Cl.
CPC .............. *F16D 65/56* (2013.01); *B61H 5/00* (2013.01); *F16D 65/0006* (2013.01);
(Continued)

(58) Field of Classification Search
CPC ........ F16D 65/54; F16D 65/56; F16D 65/567; F16D 55/2255; F16D 55/2245; B61H 5/00
(Continued)

(56) References Cited

U.S. PATENT DOCUMENTS 4,161,321 A 7/1979 Hendrixon et al.
4,705,147 A 11/1987 Pressaco et al.
(Continued)

FOREIGN PATENT DOCUMENTS

JP S62-7382 B2 2/1987
JP H05-34527 B2 5/1993
(Continued)

*Primary Examiner* — Christopher P Schwartz
(74) *Attorney, Agent, or Firm* — Rabin & Berdo, P.C.

(57) ABSTRACT

The brake device includes a coupling member configured to couple one end portions of a pair of link arms to each other, the coupling member being extendable and contractable; and an adjuster configured to cause the coupling member to extend. The adjuster includes: an extension mechanism having an extension shaft provided with a male thread and an extension nut provided with a female thread configured to be screwed with the male thread; and a resistance imparting portion configured to impart resistance to the rotation of the extension nut. The resistance imparting portion includes: a sliding contact portion having an end gap, the inner circumference of the sliding contact portion being in sliding contact with the outer circumference of the extension nut; and a coil spring configured to impart a frictional force to the extension nut by biasing the sliding contact portion in the direction of closing of the end gap.

3 Claims, 5 Drawing Sheets

(51) Int. Cl.
*F16D 65/18* (2006.01)
*F16D 65/54* (2006.01)
*F16D 65/00* (2006.01)
*F16D 65/092* (2006.01)

(52) U.S. Cl.
CPC ............ *F16D 65/18* (2013.01); *F16D 65/54* (2013.01); *F16D 65/092* (2013.01)

(58) Field of Classification Search
USPC ............ 188/71.7, 71.8, 72.1, 72.6, 72.9, 76, 188/151 R, 170, 173
See application file for complete search history.

(56) References Cited

U.S. PATENT DOCUMENTS

| | | | | |
|---|---|---|---|---|
| 5,253,736 A | * | 10/1993 | Kohler | B60T 17/081 188/170 |
| 5,813,499 A | * | 9/1998 | Staltmeir | B61H 5/00 188/59 |
| 6,722,477 B1 | * | 4/2004 | Wolfsteiner | B61H 5/00 188/173 |
| 2010/0044165 A1 | * | 2/2010 | Argirovski | F16D 55/2245 188/71.8 |
| 2014/0326547 A1 | * | 11/2014 | Yano | B61H 1/00 188/72.2 |
| 2015/0021126 A1 | * | 1/2015 | Tsurusaki | B61H 5/00 188/72.9 |
| 2016/0137213 A1 | * | 5/2016 | Kimura | F16D 55/2255 188/71.9 |
| 2016/0167682 A1 | * | 6/2016 | Asano | B60T 17/083 188/71.7 |
| 2016/0264158 A1 | * | 9/2016 | Suzuki | B61H 5/00 |
| 2017/0080958 A1 | * | 3/2017 | Suzuki | B61H 5/00 |
| 2017/0106882 A1 | * | 4/2017 | Suzuki | B61H 5/00 |
| 2017/0234377 A1 | * | 8/2017 | Suzuki | B61H 5/00 188/72.3 |
| 2018/0038428 A1 | * | 2/2018 | Severinsson | F16D 55/2245 |
| 2018/0223923 A1 | * | 8/2018 | Maehara | F16D 55/2245 |
| 2018/0274612 A1 | * | 9/2018 | Suzuki | F16D 41/064 |

FOREIGN PATENT DOCUMENTS

| | | |
|---|---|---|
| JP | 2006-104942 A | 4/2006 |
| JP | 2010-281458 A | 12/2010 |

\* cited by examiner

BRAKE DEVICE

TECHNICAL FIELD

The present invention relates to a brake device.

BACKGROUND ART

JP 2010-281458A discloses a disc brake device for sandwiching a disc with pressure using brake pads that are respectively attached to two caliper levers. The disc brake device disclosed in JP 2010-281458A includes a gap adjustment mechanism for adjusting a gap that accompanies abrasion of the brake pads. The gap adjustment mechanism utilizes a screw mechanism.

SUMMARY OF INVENTION

In general, cars and railway vehicles are subjected to vibration while running. Thus, shock induced by vibration while cars and railway vehicles are running acts on a brake device. For this reason, in a brake device that includes an adjuster (a gap adjustment mechanism) utilizing a screw mechanism, there is a possibility that the screw mechanism rotates due to vibration-induced shock, resulting in an involuntary change in the distance between end portions of a pair of link arms.

In order to prevent such vibration-induced rotation of a screw mechanism, a detent mechanism may be installed in a brake device. However, the space around a pair of link arms in a brake device is small. Therefore, if a detent mechanism has a complicated structure, it is difficult to install the detent mechanism and adjust a detent force thereof.

The present invention aims to prevent involuntary operations of an adjuster in a brake device with use of a simple structure.

According to one aspect of the present invention, a brake device for braking a wheel by sandwiching brake discs rotatable together with the wheel includes a brake main body supported by a vehicle body or a truck; a pair of link arms having support portions between one end portions and the other end portions thereof, the support portions being pivotably supported by the brake main body; brake linings supported by the other end portions of the pair of link arms so as to face opposite surfaces of the brake discs, the brake linings being configured to impart frictional forces by coming into sliding contact with the brake discs; an actuator configured to be actuated by supply and discharge of working fluid, the actuator being configured to cause the pair of link arms to pivot so as to press the brake linings against the brake discs; a coupling member configured to couple the one end portions of the pair of link arms to each other, the coupling member being extendable and contractable; and an adjuster configured to cause the coupling member to extend so that positions of the brake linings relative to the brake discs are adjusted to be constant. The adjuster includes an extension mechanism having a first member and a second member, the extension mechanism being configured to cause the coupling member to extend by relative rotation of the first member and the second member, the first member being non-rotatable and provided with a first screw portion, the second member being rotatable and provided with a second screw portion screwed with the first screw portion; a torque transmission portion mounted on an outer circumference of the second member, the torque transmission portion being configured to transmit a rotation torque to the second member only in a direction associated with extension of the extension mechanism; and a resistance imparting portion configured to impart resistance to rotation of the second member. The resistance imparting portion includes a sliding contact portion having an end gap, an inner circumference of the sliding contact portion being in sliding contact with the outer circumference of the second member; and a biasing member configured to bias the sliding contact portion in a direction of closing of the end gap so as to impart a frictional force to the second member.

DESCRIPTION OF EMBODIMENTS

The following describes an embodiment of the present invention with reference to the attached drawings.

First, a configuration of a brake device 100 according to the present embodiment will be described with reference to FIGS. 1 and 2.

The brake device 100 is mainly used in a railway vehicle. The brake device 100 brakes a wheel 1 by sandwiching brake discs 1a that rotate together with the wheel 1. Specifically, the brake device 100 is configured to sandwich the brake discs 1a from opposite surfaces of the brake discs 1a with use of a pair of brake linings 2 so as to brake the rotation of the wheel 1 using frictional forces between the brake discs 1a and the brake linings 2.

The brake discs 1a are formed on opposite surfaces, that is to say, the front and back surfaces of the wheel 1, and rotate integrally with the wheel 1. Instead of being formed integrally with the wheel 1, the brake discs 1a may be provided as separate members that rotate together with the wheel 1.

Figure 1:
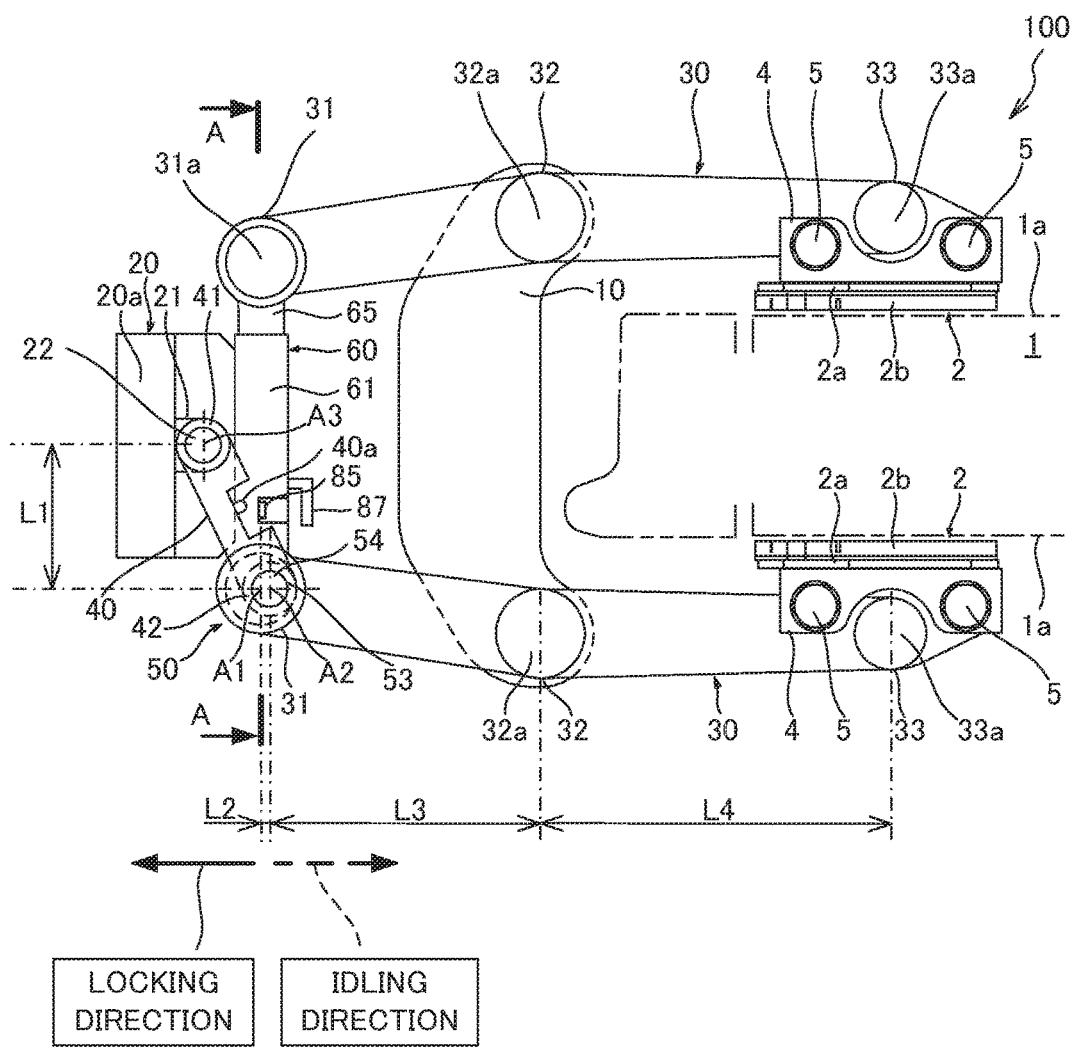
FIG. 1 is a plan view of a brake device according to an embodiment of the present invention.

When braking is not applied, the brake linings 2 oppose the brake discs 1a via a predetermined interval that has been set in advance (the state shown in FIG. 1). When braking is applied, the brake linings 2 move toward the brake discs 1a, come into contact with the brake discs 1a while being parallel to the brake discs 1a, and press the brake discs 1a.

The brake linings 2 include back plates 2a supported by lining holders 3 (see FIG. 2) of the brake device 100, and friction members 2b that come into contact with the brake discs 1a when braking is applied. The friction members 2b are composed of a plurality of segments and fixed to the surfaces of the back plates 2a. The brake linings 2 brake the rotation of the wheel 1 using frictional forces generated by contact between the friction members 2b and the brake discs 1a.

The lining holders 3 have dovetail grooves (not shown) into which the back plates 2a of the brake linings 2 are inserted. As shown in FIG. 2, anchor blocks 4 are respectively mounted on upper and lower end portions of each lining holder 3. The anchor blocks 4 are fixed to the lining holders 3 by anchor bolt pairs 5. The anchor blocks 4 fix end portions of the back plates 2a of the brake linings 2 in a longitudinal direction (a vertical direction in FIG. 2). In this way, the brake linings 2 inserted into the dovetail grooves are held by the lining holders 3.

Figure 3:
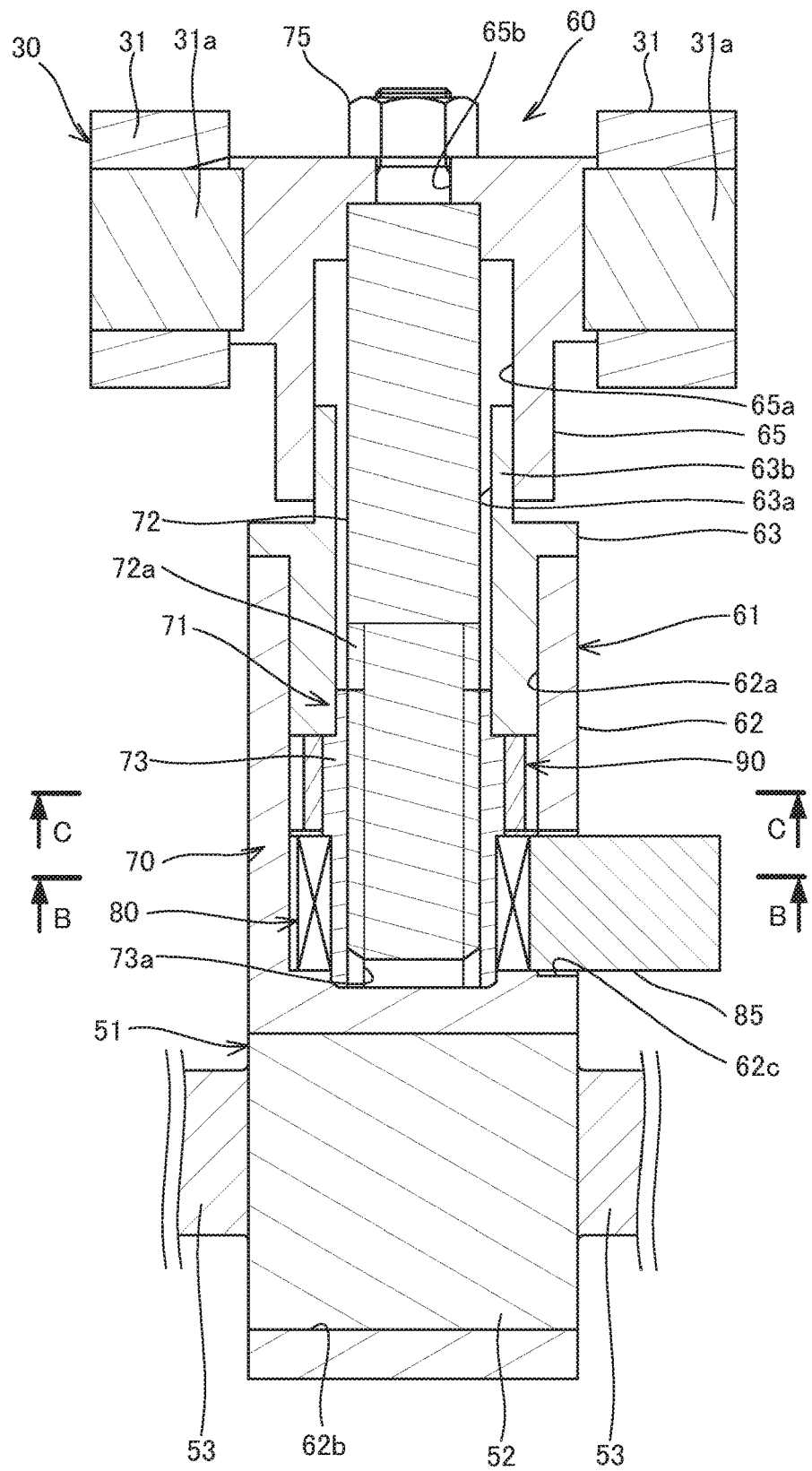
FIG. 3 is a cross-sectional view taken along the line A-A in FIG. 1.

As shown in FIG. 1, the brake device 100 includes a brake main body 10, a pair of link arms 30, an actuator 20, link levers 40, a booster unit 50, a coupling member 60, and an adjuster 70 (see FIG. 3). The link arms 30 have support portions 32 between one end portions 31 and the other end portion 33 thereof, and the support portions 32 are pivotably supported by the brake main body 10. The actuator 20 causes the pair of link arms 30 to pivot by advancing and retracting a rod 21 serving as an output member through supply and discharge of compressed air serving as working fluid, thereby pressing the brake linings 2 against the brake discs 1a. The link levers 40 are pivotably coupled to the rod 21 of the actuator 20, and pivot along with the advancement and retraction of the rod 21. The booster unit 50 is mounted on at least one of the one end portions 31 of the pair of link arms 30, and causes the link arms 30 to pivot about the support portions 32, which act as fulcrums, by boosting a force transmitted through the pivoting motion of the link levers 40. The coupling member 60 is extendable and contractable, and couples the one end portions 31 of the pair of link arms 30 to each other. The adjuster 70 causes the coupling member 60 to extend so that the positions of the brake linings 2 relative to the brake discs 1a are adjusted to be constant.

When the brake device 100 is used in a railway vehicle, the brake main body 10 is supported by a truck (not shown). When the brake device 100 is used in a vehicle other than a railway vehicle, the brake main body 10 is supported by a vehicle body (not shown).

The actuator 20 is configured to be actuated on the basis of a braking operation performed by a driver, and advances and retracts the rod 21 with respect to an actuator main body 20a attached to the coupling member 60. The actuator 20 may be a fluid pressure actuator that utilizes another type of fluid, such as working oil or similar liquid, as working fluid instead of compressed air.

The actuator 20 opposes the support portions 32, with the one end portions 31 of the link arms 30 located therebetween. That is to say, the actuator 20 opposes the brake main body 10, with the coupling member 60 located therebetween. As the actuator 20 is thus located outside an area enclosed by the coupling member 60 and the pair of link arms 30, a degree of freedom in designing the link arms 30 is improved. Therefore, the link arms 30 can be shortened, and the brake device 100 can be reduced in size and weight.

Figure 2:
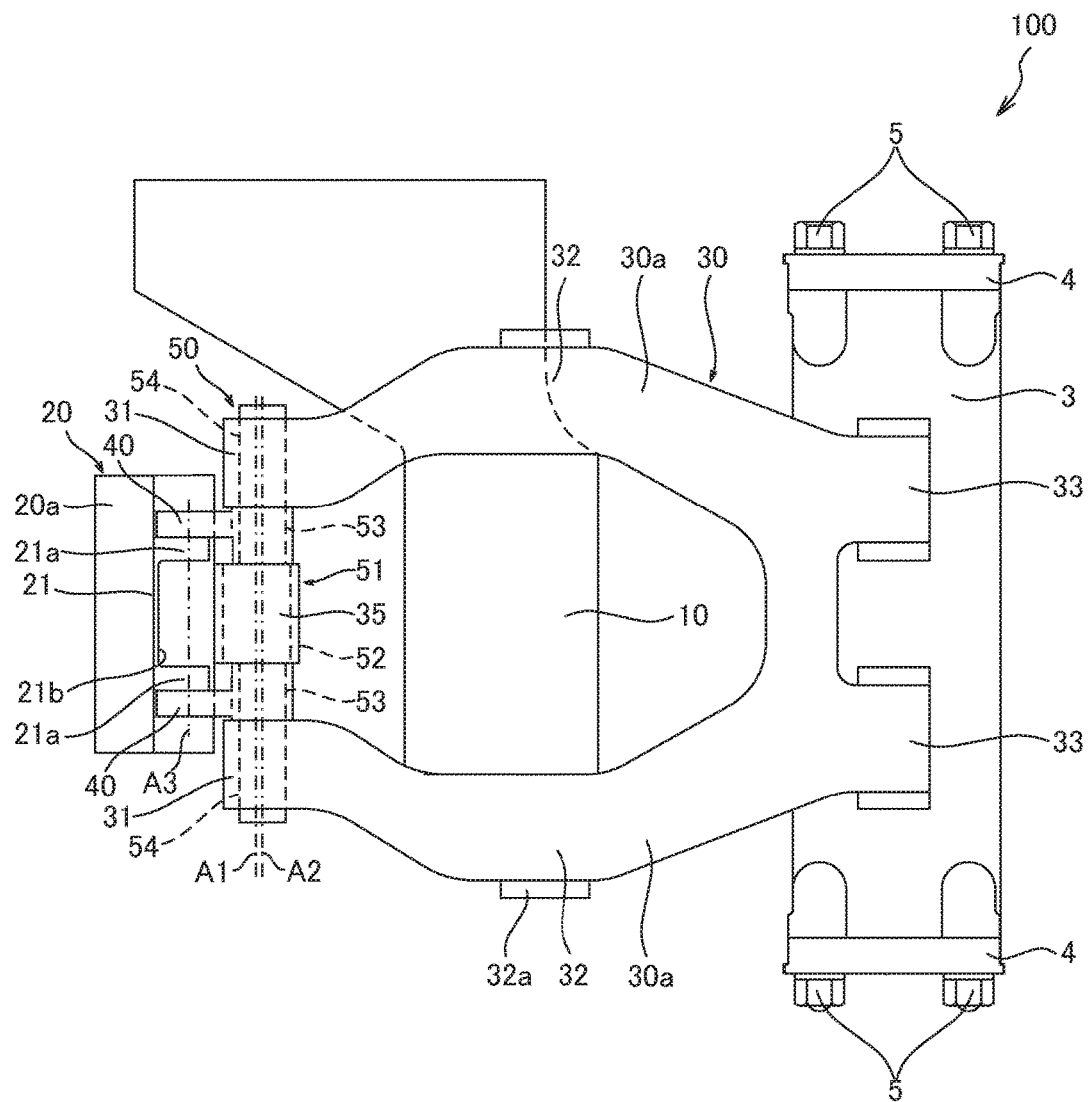
FIG. 2 is a front view of the brake device according to the embodiment of the present invention.

As shown in FIG. 2, the rod 21 is U-shaped and includes coupling portions 21a and a recess 21b. The coupling portions 21a are respectively coupled to the pair of link levers 40. The recess 21b is formed between the pair of coupling portions 21a. The recess 21b prevents interference between the rod 21 and the coupling member 60 when the rod 21 is advanced from the actuator main body 20a. Therefore, when the rod 21 is advanced from the actuator main body 20a, the coupling member 60 enters the recess 21b, and the pair of coupling portions 21a extends while avoiding the coupling member 60.

The rod 21 also includes a pair of rod shafts 22 (see FIG. 1) that enables the link levers 40 to be pivotably coupled respectively to the coupling portions 21a. The pair of rod shafts 22 is coaxially provided. The rod shafts 22 are arranged in such a manner that their central axis is parallel to the brake linings 2. The centers of the brake discs 1a are located on an extension of a central axis of the reciprocal motion of the rod 21. The rod 21 is advanced and retracted with respect to the actuator main body 20a, and swingable in a movable direction of the brake linings 2 (a vertical direction in FIG. 1).

As shown in FIG. 1, the link arms 30 respectively face opposite surfaces of the brake discs 1a. The one end portions 31 of the pair of link arms 30 are coupled to each other by the coupling member 60. The brake linings 2, which impart frictional forces by coming into sliding contact with the brake discs 1a, are swingably supported by the other end portions 33 of the link arms 30. As shown in FIG. 2, each link arm 30 is substantially U-shaped and includes a pair of upper and lower arm portions 30a.

As shown in FIG. 1, the one end portion 31 of one link arm 30 is provided with a coupling shaft 31a that penetrates and couples together the coupling member 60 and this link arm 30. The one end portion 31 of the other link arm 30 is provided with the booster unit 50 that penetrates and couples together the coupling member 60, this link arm 30, and the pair of link levers 40. The booster unit 50 causes the link arms 30 to pivot by boosting a force generated by the advancement and retraction of the rod 21 of the actuator 20.

Alternatively, the one end portion 31 of one link arm 30 and the one end portion 31 of the other link arm 30 may both be provided with the booster unit 50. In this case, the booster units 50 can respectively cause one link arm 30 and the other link arm 30 to pivot. Alternatively, the coupling member 60 may be divided into a first coupling member coupled to one link arm 30 and a second coupling member coupled to the other link arm 30, and the booster unit 50 may be provided between the first and second coupling members. The booster unit 50 will be described later in detail.

The support portions 32 of the link arms 30 are provided with arm shafts 32a that penetrate and couple together the link arms 30 and the brake main body 10. The link arms 30 are pivotably supported by the brake main body 10 via the arm shafts 32a. When braking is applied by the brake device 100, circumferential tangential forces that act on the brake linings 2 from the brake discs 1a act on the brake main body 10 from the support portions 32 via the arm shafts 32a.

The other end portions 33 of the link arms 30 are provided with lining shafts 33a that penetrate and couple together the link arms 30 and the lining holders 3. The lining holders 3 are pivotably supported by the link arms 30 via the lining shafts 33a. Accordingly, the brake linings 2 are swingable with respect to the link arms 30, and can always come into contact with the brake discs 1a while being parallel to the brake discs 1a when braking is applied.

The link levers 40 transmit a force generated by the advancement and retraction of the rod 21 of the actuator 20 to the booster unit 50. One end portions 41 of the link levers 40 are pivotably coupled to the rod shaft 22 of the rod 21. The other end portions 42 of the link levers 40 are coupled to later-described eccentric portions 53 of the booster unit 50 in such a manner that the other end portions 42 cannot pivot.

Along with the advancement and retraction of the rod 21 with respect to the actuator main body 20a, the link levers 40 pivot between the rod shaft 22 and the eccentric portions 53. In the state where the rod 21 has been advanced from the actuator main body 20a to the maximum, the link levers 40 pivot to the point where they are parallel to the coupling member 60.

A pressing pin 40a serving as a pressing portion is mounted on the link levers 40. The pressing pin 40a can press a later-described rotation lever 85 of the adjuster 70 along with the pivoting motion of the link levers 40 when braking is applied. The pressing pin 40a is provided as a shaft member that has a semispherical tip. Note that the pressing pin 40a may be formed integrally with the link levers 40. Alternatively, the pressing pin 40a may be simply formed as a semispherical projection without including a shaft portion.

As shown in FIG. 2, the booster unit 50 includes an eccentric cam 51 that rotates about a rotation axis A1 along with the pivoting motion of the link levers 40. The rotation axis A1 of the eccentric cam 51 is located in such a manner that its position is equivalent to the position of a central axis of the coupling shaft 31a relative to the link arms 30.

The eccentric cam 51 includes a rotation portion 52, the eccentric portions 53, and a pair of arm coupling portions 54. The rotation portion 52 is pivotably coupled to the coupling member 60. The eccentric portions 53 have a central axis A2 at a position offset from the rotation axis A1 of the eccentric cam 51, and pivot on an arc-shaped path about the rotation axis A1 along with the pivoting motion of the link levers 40. The pair of arm coupling portions 54 is coaxial with the eccentric portions 53 and rotatably supported by the corresponding link arm 30.

The rotation portion 52 has the same outer diameter as the coupling shaft 31a. A central axis of the rotation portion 52 is the rotation axis A1 of the eccentric cam 51.

The eccentric portions 53 have a smaller diameter than the rotation portion 52. The eccentric portions 53 are respectively mounted on opposite axial sides of the rotation portion 52. The link levers 40 are coupled to the eccentric portions 53 in such a manner that the link levers 40 cannot pivot relative to the eccentric portions 53. Therefore, when the link levers 40 pivot along with the advancement and retraction of the rod 21 with respect to the actuator main body 20a, the eccentric portions 53 pivot on an arc-shaped path about the rotation axis A1. As a result, the distance between the pair of link arms 30 is increased and reduced.

The arm coupling portions 54 have the same diameter as the eccentric portions 53. The arm coupling portions 54 oppose the rotation portion 52, with the eccentric portions 53 located therebetween. Alternatively, the arm coupling portions 54 may have a smaller diameter than the eccentric portions 53. Alternatively, each arm coupling portion 54 may be provided between the corresponding eccentric portion 53 and the rotation portion 52.

As described above, the eccentric cam 51 has the rotation portion 52 at the center thereof, the eccentric portions 53 having a smaller diameter than the rotation portion 52 at opposite ends of the rotation portion 52, and the arm coupling portions 54 having the same diameter as or a smaller diameter than the eccentric portions 53 at opposite ends of the eccentric portions 53. Therefore, the eccentric cam 51 is gradually reduced in diameter from its center toward its opposite end portions. This allows for easy processing. Furthermore, as the coupling member 60, the link levers 40, and the link arms 30 can be attached to the eccentric cam 51 in order, assembly can be facilitated.

Figure 4:
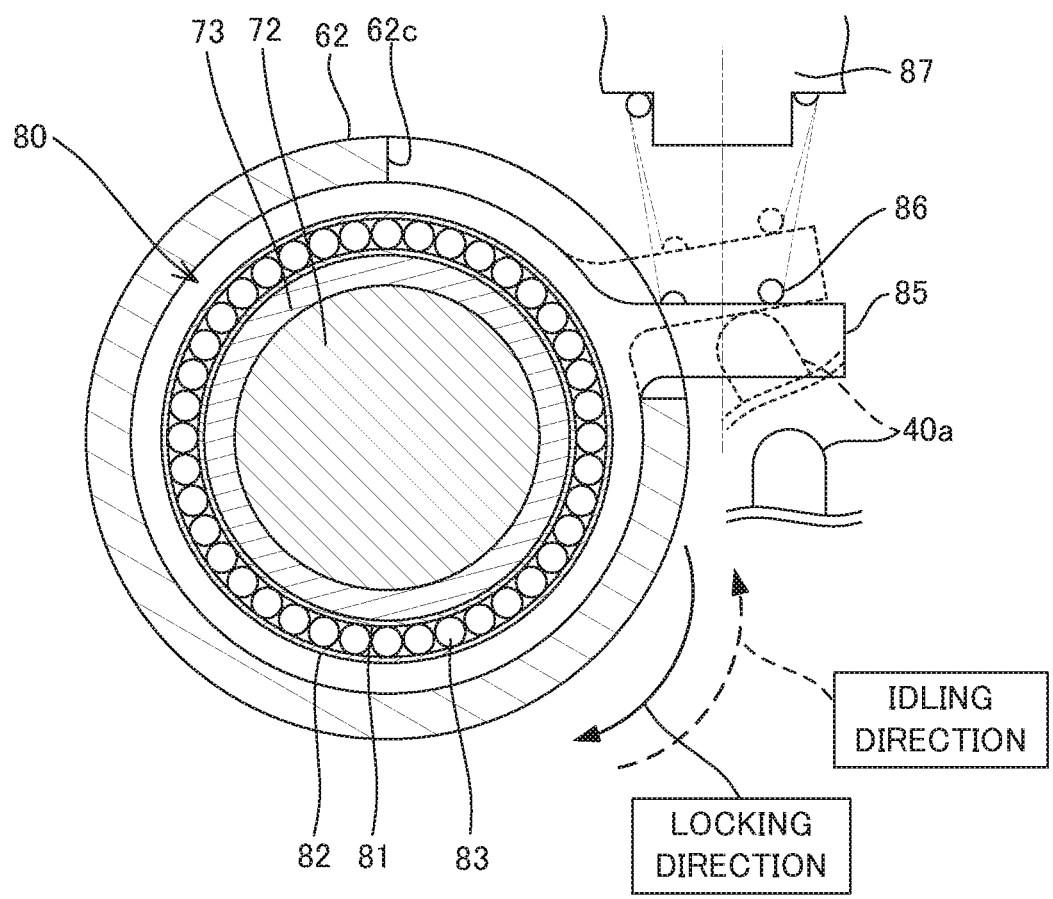
FIG. 4 is a cross-sectional view taken along the line B-B in FIG. 3.
Figure 5:
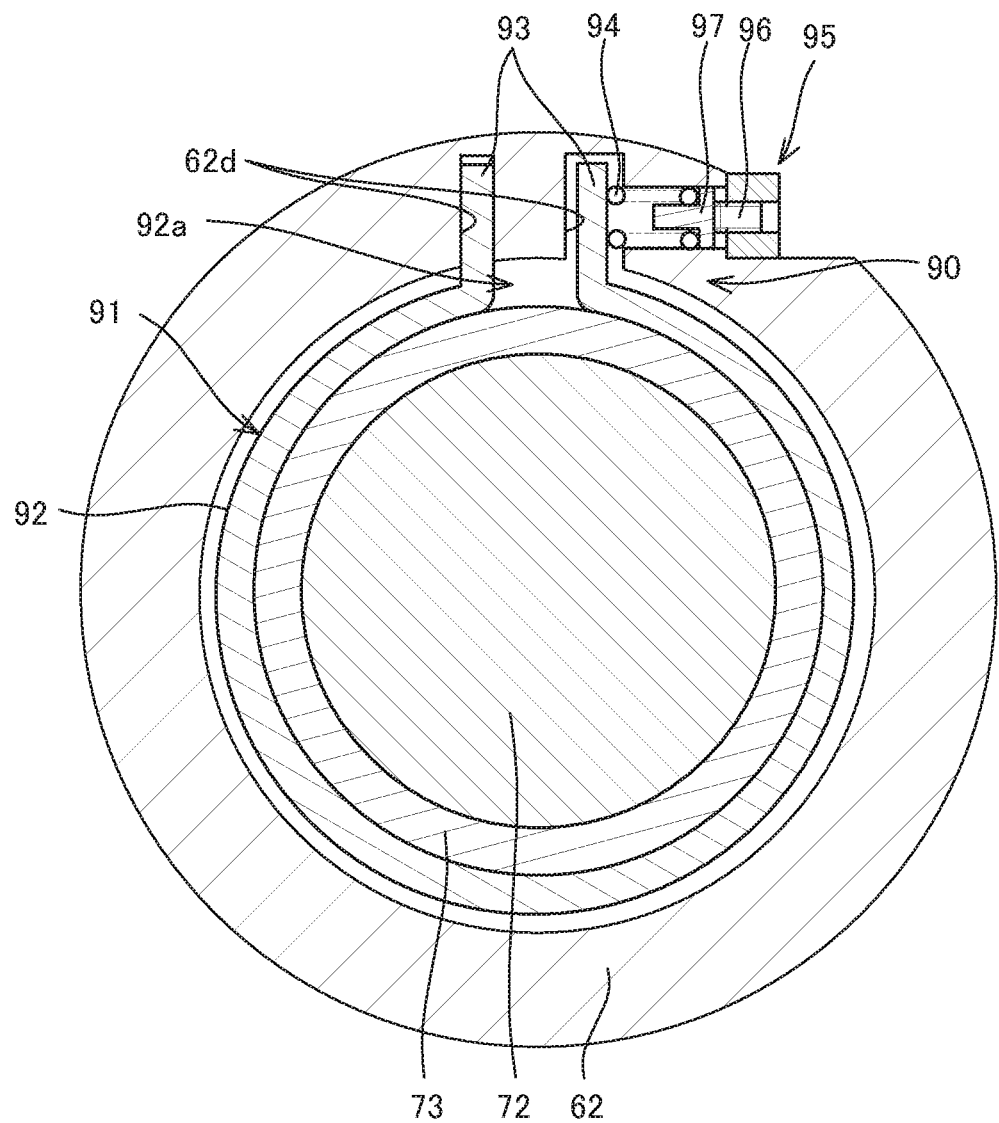
FIG. 5 is a cross-sectional view taken along the line C-C in FIG. 3.

A description is now given of the specifics of the configurations of the coupling member 60 and the adjuster 70 with reference to FIGS. 3 to 5.

As shown in FIG. 3, the coupling member 60 includes a coupling main body portion 61 whose one end is coupled to one link arm 30 via the eccentric cam 51, and a coupling rod portion 65 whose one end is coupled to the other link arm 30. The other end of the coupling main body portion 61 is inserted into the other end of the coupling rod portion 65. The coupling member 60 extends and contracts in an axial direction as the coupling main body portion 61 and the coupling rod portion 65 move relative to each other in the axial direction. The coupling member 60 is provided with a dust cover (not shown) that covers the other ends of the coupling main body portion 61 and the coupling rod portion 65 to prevent intrusion of dust. The actuator main body 20a of the actuator 20 is attached to the coupling main body portion 61 (see FIG. 1).

The coupling main body portion 61 includes a coupling base portion 62 to which the eccentric cam 51 is coupled, and an insertion portion 63 that is inserted into the coupling rod portion 65.

The coupling base portion 62 has a main body recess 62a that opens at one end side of the coupling base portion 62, and a cam hole 62b into which the rotation portion 52 of the eccentric cam 51 is rotatably inserted. The coupling main body portion 61 is coupled to the corresponding link arm 30 via the eccentric cam 51.

The insertion portion 63 is disposed at the opening of the main body recess 62a. The insertion portion 63 has a through hole 63a formed along the axial direction, and its tip portion 63b is inserted into the coupling rod portion 65.

The coupling rod portion 65 has an insertion recess 65a into which the insertion portion 63 of the coupling main body portion 61 is slidably inserted, and an insertion hole 65b through which an extension shaft 72 of a later-described extension mechanism 71 is inserted. The one end portion 31 of the other link arm 30 is coupled to the coupling rod portion 65.

When the brake linings 2 have been abraded by the brake device 100 in a braking state, the adjuster 70 causes the coupling member 60 to extend in accordance with the amount of abrasion of the brake linings 2. As shown in FIG. 3, the coupling member 60 serves as a housing inside which the adjuster 70 is placed.

The adjuster 70 includes the extension mechanism 71, a one-way clutch 80, and a resistance imparting portion 90. The extension mechanism 71 causes the coupling member 60 to extend using a relatively-rotatable screw mechanism. The one-way clutch 80 serves as a torque transmission portion that can transmit a rotation torque to the extension mechanism 71 only in a direction associated with the extension of the extension mechanism 71. The resistance imparting portion 90 imparts resistance to the rotation of the screw mechanism of the extension mechanism 71.

The extension mechanism 71 includes the extension shaft 72 and an extension nut 73. The extension shaft 72 serves as a first member provided with a male thread 72a serving as a first screw portion. The extension nut 73 serves as a second member provided with a female thread 73a serving as a second screw portion that is screwed with the male thread 72a of the extension shaft 72.

The extension shaft 72 is placed inside the coupling main body portion 61 and the coupling rod portion 65 of the coupling member 60 in such a manner that it extends over the coupling main body portion 61 and the coupling rod portion 65. The extension shaft 72 is placed with a gap between itself and an inner circumference of the insertion portion 63 of the coupling main body portion 61. One end of the extension shaft 72 is inserted through the insertion hole 65b of the coupling rod portion 65 of the coupling member 60, and fixed to the coupling rod portion 65 by a nut 75. That is to say, the extension shaft 72 is fixed to the coupling rod portion 65 of the coupling member 60, which serves as the housing, in such a manner that the extension shaft 72 cannot rotate. The other end of the extension shaft 72 is provided with the male thread 72a and housed inside the coupling main body portion 61.

The extension nut 73 is disposed inside the main body recess 62a of the coupling base portion 62, and is screwed with the male thread 72a of the extension shaft 72. More specifically, the extension nut 73 is rotatably disposed between the main body recess 62a of the coupling base portion 62 and the insertion portion 63 that closes the opening of the main body recess 62a.

As shown in FIGS. 3 and 4, the one-way clutch 80 includes an inner race 81, an outer race 82, and sprags 83. The inner race 81 is press-fit on an outer circumference of the extension nut 73. The rotation lever 85 that projects radially outward and is exposed to the outside of the coupling member 60 is mounted on the outer race 82. The sprags 83 are disposed between the inner race 81 and the outer race 82.

In the one-way clutch 80, the sprags 83 lock the inner race 81 and the outer race 82 together when the inner race 81 and the outer race 82 relatively rotate in one direction, whereas the inner race 81 and the outer race 82 idle together when they relatively rotate in the other direction. The rotation lever 85 is exposed to the outside of the coupling base portion 62 of the coupling member 60 via a circumferential groove 62c. The circumferential groove 62c is formed in a part of the coupling base portion 62 in a circumferential direction, and penetrates the inner and outer circumferential surfaces of the coupling base portion 62.

The coupling main body portion 61 also includes a support wall portion 87 for supporting a lever spring 86 serving as a lever biasing member that biases the rotation lever 85 (see FIGS. 1 and 4). The lever spring 86 is interposed in a compressed state between the support wall portion 87 and the rotation lever 85, and biases the rotation lever 85 in a direction in which the inner race 81 and the outer race 82 of the one-way clutch 80 are locked together. The lever spring 86 is a tapered spring that decreases in winding diameter from the support wall portion 87 toward the rotation lever 85. When braking is not applied by the brake device 100, the lever spring 86 biases the rotation lever 85 against one end of the circumferential groove 62c, thereby bringing the rotation lever 85 into contact with a wall portion of the circumferential groove 62c. Note that the lever spring 86 is not limited to the tapered spring, and may be a coil spring having a constant winding diameter.

When a rotation torque in one direction (a direction of a solid-line arrow in FIG. 4) acts on the outer race 82 of the one-way clutch 80 via the rotation lever 85, the inner race 81 and the outer race 82 of the one-way clutch 80 are locked together, and the one-way clutch 80 rotates in one direction together with the extension nut 73. In contrast, when a rotation torque in the other direction (a direction of a dash-line arrow in FIG. 4) acts on the outer race 82 of the one-way clutch 80, the inner race 81 and the outer race 82 of the one-way clutch 80 idle, and only the outer race 82 of the one-way clutch 80 rotates. Hereinafter, a rotation direction in which the outer race 82 is locked with the inner race 81 (the direction of the solid-line arrow in FIG. 4), that is to say, a direction in which the one-way clutch 80 and the extension nut 73 rotate together, is referred to as a "locking direction". In contrast, a rotation direction in which the outer race 82 idles relative to (slips with respect to) the inner race 81 (the direction of the dash-line arrow in FIG. 4) is referred to as an "idling direction".

As the one-way clutch 80 rotates in the locking direction together with the extension nut 73, the extension nut 73 rotates relative to the extension shaft 72. As a result, the extension nut 73 and the extension shaft 72 move away from each other, and the extension mechanism 71 extends. Accordingly, the coupling main body portion 61 coupled to the extension nut 73 and the coupling rod portion 65 coupled to the extension shaft 72 move away from each other, and the coupling member 60 extends. As such, the one-way clutch 80 transmits a rotation torque to the extension nut 73 only in the direction that causes the extension nut 73 and the extension shaft 72 to move away from each other, that is to say, the direction associated with the extension of the extension mechanism 71.

The pressing pin 40a presses the rotation lever 85 along with the pivoting motion of the link levers 40 when braking is applied. This causes the one-way clutch 80 to rotate in the idling direction. In other words, the rotation lever 85 is pressed by the link levers 40 via the pressing pin 40a along with the pivoting motion of the link levers 40 when braking is applied. In FIG. 1, a direction of a solid-line arrow denotes the locking direction, whereas a direction of a dash-line arrow denotes the idling direction.

As shown in FIG. 5, the resistance imparting portion 90 includes a sliding contact portion 91, a coil spring 94, and a biasing force adjustment mechanism 95. The sliding contact portion 91 has an end gap (a ring end gap) 92a, and its inner circumference is in sliding contact with the outer circumference of the extension nut 73. The coil spring 94 serves as a biasing member that imparts a frictional force to the extension nut 73 by biasing the sliding contact portion 91 in a direction in which the end gap 92a is closed. The biasing force adjustment mechanism 95 adjusts a biasing force imparted by the coil spring 94 to the sliding contact portion 91.

The sliding contact portion 91 includes a main body portion 92 and a pair of flat plate portions 93. The main body portion 92 is C-shaped and defines the end gap 92a between its opposite ends. The flat plate portions 93 project radially outward from the opposite ends of the main body portion 92, and are parallel to each other. The sliding contact portion 91 is a metallic member that is elastically deformed by an external force. The flat plate portions 93 are respectively housed in groove portions 62d that are formed in the coupling base portion 62 of the coupling main body portion 61. One of the flat plate portions 93 is housed in the corresponding groove portion 62d with a gap between itself and a wall portion. That is to say, the thickness of one of the flat plate portions 93 is smaller than the width of the corresponding groove portion 62d, and housed inside the corresponding groove portion 62d without being constrained by the wall portion.

The coil spring 94 is interposed in a compressed state between one of the flat plate portions 93 of the sliding contact portion 91 and the biasing force adjustment mechanism 95, and biases one of the flat plate portions 93 in the direction in which the end gap 92a is closed. As the coil spring 94 biases one of the flat plate portions 93 in the direction in which the end gap 92a is closed, the main body portion 92 of the sliding contact portion 91 is pushed against the outer circumference of the extension nut 73. Therefore, when the extension nut 73 rotates, the main body portion 92 and the extension nut 73 come into sliding contact with each other, thereby imparting a frictional force to the rotation of the extension nut 73. As the resistance imparting portion 90 thus imparts the frictional force to the rotation of the extension nut 73, involuntary rotation of the extension nut 73 relative to the extension shaft 72 caused by, for example, vibration of the vehicle is prevented.

The biasing force adjustment mechanism 95 adjusts a set load of the coil spring 94, that is to say, the magnitude of a biasing force acting on one of the flat plate portions 93, by changing the compression length of the coil spring 94. The biasing force adjustment mechanism 95 may be configured in any manner as long as it can change the biasing force of the coil spring 94.

For example, as shown in FIG. 5, the biasing force adjustment mechanism 95 may be configured in such a manner that a contact plate 97, which is in contact with the coil spring 94, is moved along with the rotation of an adjustment screw 96 manipulated by an operator. In this case, when twisted and fastened, the adjustment screw 96 pushes the contact plate 97, thereby making the coil spring 94 compressed. As a result, the biasing force of the coil spring 94 increases. Conversely, when the adjustment screw 96 is loosened, the contact plate 97 moves in a direction of the extension of the coil spring 94 due to the biasing force of the coil spring 94. As a result, the biasing force of the coil spring 94 decreases. As the biasing force adjustment mechanism 95 thus adjusts the biasing force of the coil spring 94, a frictional force between the extension nut 73 and the sliding contact portion 91, that is to say, a detent force for preventing the extension nut 73 from rotating relative to the extension shaft 72, can easily be adjusted.

During the extension of the extension mechanism 71, the extension nut 73 rotates relative to the extension shaft 72 while in sliding contact with the sliding contact portion 91. Repetitive extension operations of the extension mechanism 71 could possibly abrade one or both of the extension nut 73 and the sliding contact portion 91. In view of this, in the resistance imparting portion 90, one of the flat plate portions 93 is movably placed inside the corresponding groove portion 62d with a gap between itself and the wall portion, and is biased by the coil spring 94. Thus, when the extension nut 73 and the sliding contact portion 91 have been abraded, one of the flat plate portions 93 moves toward the wall portion of the corresponding groove portion 62d due to the biasing force of the coil spring 94 in accordance with the amount of abrasion. Therefore, even if the extension nut 73 and the sliding contact portion 91 have been abraded, the end gap 92a of the sliding contact portion 91 is closed in accordance with the amount of abrasion, thereby reliably bringing the extension nut 73 and the sliding contact portion 91 into contact with each other. As a result, a reduction in the detent force caused by the abrasion of the extension nut 73 and the sliding contact portion 91 can be prevented, and the detent force can be stabilized.

A description is now given of the functions of the brake device 100 with reference to FIGS. 1 and 2.

Once the actuator 20 has been actuated on the basis of a braking operation performed by a driver, the brake device 100 switches from a non-braking state (the state shown in FIGS. 1 and 2) to a braking state.

Once the rod 21 has been advanced from the actuator main body 20a along with the actuation of the actuator 20, the link levers 40 are pushed by the rod shafts 22 and pivot. The force imparted by the actuator 20 to advance the rod 21 is transmitted to the eccentric portions 53 of the eccentric cam 51 via the link levers 40.

The eccentric cam 51 rotates in one direction (in FIG. 1, a clockwise direction) as the eccentric portions 53 pivot on an arc-shaped path about the rotation axis A1 due to the force transmitted via the link levers 40. As a result, the arm coupling portions 54 pivot integrally with the eccentric portions 53 in a direction away from the rod 21, and thus the one end portions 31 of the pair of link arms 30 move away from each other.

The link arms 30 are pivotably supported by the brake main body 10 via the support portions 32. Thus, as the one end portions 31 move away from each other, the other end portions 33 move toward each other. As a result, the brake linings 2 move toward, come into contact with, and are pressed against the brake discs 1a while being parallel to the brake discs 1a, thereby braking the rotation of the wheel 1.

At this time, the eccentric cam 51 boosts a force transmitted from the rod 21 via the link levers 40 by a factor of L1/L2, and transmits the boosted force to the link arms 30. This boosting is performed on the basis of a lever ratio between a distance L1 from the central axis A3 of the rod shafts 22 to the rotation axis A1 and a distance L2 from the rotation axis A1 and the central axis A2 of the eccentric portions 53. In this way, a large braking force can be obtained without providing a large actuator. Therefore, the brake device 100 can be reduced in size and weight.

In the link arms 30, the support portions 32 between the one end portions 31 and the other end portions 33 are supported in such a manner that they can pivot with respect to the brake main body 10. The eccentric cam 51, which causes the link arms 30 to pivot by boosting a force transmitted from the rod 21 along with the pivoting motion of the link levers 40, is mounted on the one end portion 31 of the corresponding link arm 30. Therefore, when braking is applied by the brake device 100, circumferential tangential forces that act on the brake linings 2 from the brake discs 1a act on the arm shafts 32a of the support portions 32, and do not act on the eccentric cam 51. Thus, frictional resistance does not increase during the rotation of the eccentric cam 51. This can improve the mechanical efficiency when braking is applied by the brake device 100.

The force transmitted from the eccentric cam 51 to the one end portions 31 of the link arms 30 is boosted by a factor of L3/L4. This boosting is performed on the basis of a lever ratio between a distance L3 from the one end portions 31 to the support portions 32 and a distance L4 from the support portions 32 to the other end portions 33. In the brake device 100, as the distance L4 is larger than the distance L3, forces that press the brake linings 2 against the brake discs 1a are smaller than a force transmitted from the eccentric cam 51 to the one end portions 31 of the link arms 30.

However, in the brake device 100, the eccentric cam 51 boosts a force transmitted from the rod 21 of the actuator 20 via the link levers 40 by a large factor. Therefore, a sufficiently large braking force can be obtained even if the link arms 30 are shortened to reduce the distance L3 for the purpose of reducing the size and weight of the brake device 100.

Note that in the brake device 100, a degree of freedom in designing the positions of the arm shafts 32a of the support portions 32 is high, because the eccentric cam 51 is mounted on the one end portion 31 of the corresponding link arm 30. This makes it possible to arrange the arm shafts 32a at positions facing a side surface of the wheel 1. Therefore, the distance L3 can be made larger than the distance L4, and the brake linings 2 can be pressed against the brake discs 1a by further boosting the force boosted by the eccentric cam 51.

When the actuator 20 is actuated in a direction opposite to a braking direction on the basis of a braking releasing operation performed by a driver, the brake device 100 switches from the braking state to the non-braking state (the state shown in FIGS. 1 and 2).

Once the rod 21 has been retracted into the actuator main body 20a along with the actuation of the actuator 20, the link levers 40 are pulled by the rod shafts 22 and pivot. The force imparted by the actuator 20 to retract the rod 21 is transmitted to the eccentric portions 53 of the eccentric cam 51 via the link levers 40.

The eccentric cam 51 rotates in the other direction (in FIG. 1, a counterclockwise direction) as the eccentric portions 53 pivot on an arc-shaped path about the rotation axis A1 due to the force transmitted via the link levers 40. As a result, the one end portions 31 of the pair of link arms 30 move toward each other. Accordingly, the other end portions 33 of the pair of link arms 30 move away from each other. This causes the brake linings 2 to move away from the brake discs 1*a*, thereby releasing braking of the wheel 1.

A description is now given of the functions of the adjuster 70 with reference to FIG. 4.

When the amount of abrasion of the brake linings 2 is small, the amount of movement of the brake linings 2 toward the brake discs 1*a* is small. Therefore, even if the brake device 100 has entered the braking state along with the actuation of the actuator 20, the pressing pin 40*a* mounted on the link levers 40 does not come into contact with and press the rotation lever 85 of the adjuster 70, as indicated by solid lines in FIG. 4.

With the progression of the abrasion of the brake linings 2, the amount of movement of the brake linings 2 toward the brake discs 1*a* increases. In this case, when the brake device 100 is in the braking state, the link levers 40 press the rotation lever 85 via the pressing pin 40*a* against a biasing force of the lever spring 86 along with the pivoting motion of the link levers 40, as indicated by dash lines in FIG. 4. As the pressing pin 40*a* presses the rotation lever 85, the one-way clutch 80 rotates in the idling direction.

In this situation, if the braking state is released, the link levers 40 pivot, and the pressing pin 40*a* moves back. Accordingly, the rotation lever 85 moves in the locking direction due to the biasing force of the lever spring 86, and a rotation torque in the locking direction acts on the outer race 82 of the one-way clutch 80. The one-way clutch 80 transmits the rotation torque in the locking direction to the extension nut 73. Therefore, the extension nut 73 rotates. As a result, the extension nut 73 and the extension shaft 72 move away from each other, and the extension mechanism 71 extends.

As the extension mechanism 71 extends, the coupling member 60 extends, and the one end portions 31 of the pair of link arms 30 move away from each other. In other words, as the coupling member 60 extends, the distance between the eccentric cam 51 coupled to the coupling base portion 61 of the coupling member 60 and the coupling shaft 31*a* coupled to the coupling main body portion 65 increases.

As the one end portions 31 of the pair of link arms 30 move away from each other, the pair of link arms 30 pivots about the support portions 32, which act as fulcrums, and the other end portions 33 move toward each other. As described above, as the distance between the one end portions 31 of the pair of link arms 30 is increased by the extension of the coupling member 60, the positions of the brake linings 2 can be brought close to the brake discs 1*a* by the thickness corresponding to the abrasion when braking is not applied. Therefore, even if the brake linings 2 have been abraded, the intervals between the brake linings 2 and the brake discs 1*a* can always be kept constant when braking is not applied.

The actuator main body 20*a* and the booster unit 50 are attached to the coupling main body portion 61 of the coupling member 60. The coupling member 60 extends as the coupling main body portion 61 and the coupling rod portion 65 move relative to each other. Therefore, the extension of the coupling member 60 caused by the abrasion of the brake linings 2 does not change the positional relationship between the actuator 20 and the booster unit 50. This can prevent a change in the actuation properties of the actuator 20 regardless of the abrasion of the brake linings 2.

When the coupling member 60 is extended using the adjuster 70, the extension nut 73 rotates in a clockwise direction in FIG. 5 so as to move away from the extension shaft 72. Due to the rotation of the extension nut 73, a force that increases the end gap 92*a*, that is to say, a force in a direction against the biasing force of the coil spring 94 acting on one of the flat plate portions 93, acts on the sliding contact portion 91. Accordingly, a part of the biasing force of the coil spring 94 is negated, and the frictional force between the extension nut 73 and the sliding contact portion 91 is reduced. In this way, when the extension nut 73 is deliberately rotated using the adjuster 70, the rotation of the extension nut 73 is not obstructed by the sliding contact portion 91.

If a force that causes involuntary rotation in a counterclockwise direction in FIG. 5 acts on the extension nut 73 due to, for example, vibration of the vehicle when braking is not applied, a force that closes the end gap 92*a*, in other words, a force in the same direction as the biasing force of the coil spring 94, acts on the sliding contact portion 91. Accordingly, the frictional force between the extension nut 73 and the sliding contact portion 91 increases. This effectively prevents involuntary rotation of the extension nut 73.

Even if the extension nut 73 is subjected to a force that causes rotation in the clockwise direction in FIG. 5 due to, for example, vibration of the vehicle, involuntary rotation of the extension nut 73 in the clockwise direction in FIG. 5 is prevented because the coil spring 94 imparts a biasing force so as to prevent the end gap 92 from being opened by the movement of one of the flat plate portions 93. In other words, the biasing force of the coil spring 94 not only prevents the extension nut 73 from involuntarily rotating in any direction relative to the extension shaft 72 due to, for example, vibration of the vehicle, but also is adjusted in such a manner that deliberate rotation of the extension nut 73 relative to the extension shaft 72 is allowed when the coupling member 60 is extended using the adjuster 70.

The foregoing embodiment achieves the following advantageous effects.

In the brake device 100, the rotation of the extension nut 73 relative to the extension shaft 72 can be arrested by the resistance imparting portion 90 that includes the sliding contact portion 91, which is in sliding contact with the extension nut 73, and the coil spring 94, which imparts a frictional force to the extension nut 73 by pushing the sliding contact portion 91. That is to say, the rotation of the extension nut 73 relative to the extension shaft 72 can be arrested by a simple structure with the C-shaped sliding contact portion 91 and the coil spring 94. As the rotation can be arrested by such a simple structure, the adjuster 70 can be reduced in size. Accordingly, the brake device 100 can be reduced in size.

The coil spring 94 biases the sliding contact portion 91 so as to close the end gap 92*a* of the sliding contact portion 91. Therefore, if abrasion occurs between the sliding contact portion 91 and the extension nut 73, the end gap 92*a* is closed in accordance with the amount of abrasion. In this way, even if abrasion occurs between the sliding contact portion 91 and the extension nut 73, the extension nut 73 and the sliding contact portion 91 can reliably be brought into contact with each other. As a result, a reduction in the detent force caused by the abrasion of the extension nut 73 and the sliding contact portion 91 can be prevented, and the detent force can be stabilized.

As the adjuster 70 includes the biasing force adjustment mechanism 95 that adjusts the biasing force of the coil spring 94 of the resistance imparting portion 90, it is possible to adjust the frictional force between the extension nut 73 and the sliding contact portion 91, that is to say, the detent force that prevents the rotation of the extension nut 73 relative to the extension shaft 72.

In the adjuster 70, when braking is applied, the rotation lever 85 is pressed by the pressing pin 40a mounted on the link levers 40 along with the pivoting motion of the link levers 40. When braking is not applied, the extension nut 73 rotates as the pressing pin 40a moves back, thereby causing the coupling member 60 to extend. As the pressing pin 40a for driving the adjuster 70 is thus directly mounted on the link levers 40 that actuate the brake device 100, there is no need to provide a link mechanism and the like for pressing the pressing pin 40a. That is to say, the adjuster 70 can be driven by a simple and small structure.

Below is a comprehensive description of the configurations, functions, and advantageous effects of the embodiment of the present invention.

The brake device 100 brakes the wheel 1 by sandwiching the brake discs 1a rotatable together with the wheel 1. The brake device 100 includes: the brake main body 10 supported by a vehicle body or a truck; the pair of link arms 30 having the support portions 32 between the one end portions 31 and the other end portions 33 thereof, the support portions 32 being pivotably supported by the brake main body 10; the brake linings 2 supported by the other end portions 33 of the pair of link arms 30 so as to face the opposite surfaces of the brake discs 1a, the brake linings 2 being configured to impart frictional forces by coming into sliding contact with the brake discs 1a; the actuator 20 actuated by supply and discharge of compressed air, and configured to press the brake linings 2 against the brake discs by causing the pair of link arms 30 to pivot; the coupling member 60 configured to couple the one end portions 31 of the pair of link arms 30 to each other, the coupling member 60 being extendable and contractable; and the adjuster 70 configured to cause the coupling member 60 to extend so that the positions of the brake linings 2 relative to the brake discs 1a are adjusted to be constant. The adjuster 70 includes: the extension mechanism 71 having the extension shaft 72 and the extension nut 73 and configured to cause the coupling member 60 to extend along with the rotation of the extension nut 73 relative to the extension shaft 72, the extension shaft 72 being non-rotatable and provided with the male thread 72a, the extension shaft 73 being rotatable and provided with the female thread 73a configured to be screwed with the male thread 72a; the one-way clutch 80 mounted on the outer circumference of the extension nut 73 and configured to transmit a rotation torque to the extension nut 73 only in the direction associated with the extension of the extension mechanism 71; and the resistance imparting portion 90 configured to impart resistance to the rotation of the extension nut 73. The resistance imparting portion 90 includes: the sliding contact portion 91 having the end gap 92a, the inner circumference of the sliding contact portion 91 being in sliding contact with the outer circumference of the extension nut 73; and the coil spring 94 configured to impart a frictional force to the extension nut 73 by biasing the sliding contact portion 91 in the direction of closing of the end gap 92a.

With the foregoing configuration, the coil spring 94 imparts a frictional force between the sliding contact portion 91 and the extension nut 73. This frictional force prevents the extension nut 73 from rotating due to vibration and the like while the vehicle is running. In this way, a simple structure with the sliding contact portion 91 and the coil spring 94 arrests the rotation of the adjuster 70. Therefore, with the foregoing configuration, involuntary actuation of the adjuster 70 of the brake device 100 can be prevented using the simple structure.

In the brake device 100, the adjuster 70 further includes the biasing force adjustment mechanism 95 configured to adjust a biasing force imparted by the coil spring 94 to the sliding contact portion 91.

With the foregoing configuration, the biasing force adjustment mechanism 95 can arbitrarily set a detent force with respect to the extension nut 73.

The brake device 100 further includes the link levers 40 that are pivotably coupled to the rod 21 of the actuator 20, and configured to increase and reduce the distance between the one end portions 31 of the pair of link arms 30 by pivoting along with the advancement and retraction of the rod 21. The adjuster 70 further includes: the rotation lever 85 projecting radially outward from the one-way clutch 80, and exposed to the outside of the adjuster 70; and the lever spring 86 configured to bias the rotation lever 85 in the direction of transmission of the rotation torque from the one-way clutch 80 to the extension nut 73. Along with the pivoting motion of the link levers 40 when braking is applied, the rotation lever 85 is pressed by the link levers 40 against the biasing force of the lever spring 96.

With the foregoing configuration, when braking is applied, the rotation lever 85 is pressed by the pivoting link levers 40 via the pressing pin 40a. When braking is not applied, the extension nut 73 rotates as the link levers 40 move back, thereby causing the coupling member 60 to extend. As such, the rotation lever 85 is pressed by the link levers 40 that actuate the brake device 100. That is to say, the adjuster 70 can be driven using a simple and small structure.

Embodiments of this invention were described above, but the above embodiments are merely examples of applications of this invention, and the technical scope of this invention is not limited to the specific constitutions of the above embodiments.

For example, the rod 21 of the actuator 20 and the link levers 40 may be covered with a cover member (not shown). In this way, the rod 21 and the link levers 40 that operate when the brake device 100 is actuated can be protected.

In the above-described embodiment, whereas the extension shaft 72 is not rotatable, the extension nut 73 is rotatable, and the extension mechanism extends as a rotation torque is transmitted to the extension nut 73. Alternatively, the extension shaft 72 may be rotatable, and the extension nut 73 may not be rotatable.

In the above-described embodiment, the adjuster 70 includes the one-way clutch 80 serving as the torque transmission portion. Alternatively, the adjuster 70 may include another component that transmits a torque only in one direction. For example, the adjuster 70 may include a ratchet mechanism serving as the torque transmission portion.

In the above-described embodiment, the pressing pin 40a is mounted on the link levers 40, and the pivoting link levers 40 press the rotation lever 85 via the pressing pin 40a when braking is applied. Alternatively, the pressing pin 40a may be mounted on the rotation lever 85. Although it is preferable for the rotation lever 85 to be pressed by the link levers 40 via the pressing pin 40a, the pressing pin 40a may not be provided, that is to say, the rotation lever 85 may be pressed directly by the link levers 40. It is thus sufficient to configure the rotation lever 85 in such a manner that, with the progression of the abrasion of the brake linings 2, the rotation lever 85 is pressed by the link levers 40 against the biasing force of the lever spring 86 along with the pivoting motion of the link levers 40 when braking is applied.

This application claims priority based on Japanese Patent Application No. 2015-48618 filed with the Japan Patent Office on Mar. 11, 2015, the entire contents of which are incorporated into this specification.

The invention claimed is:

1. A brake device for braking a wheel by sandwiching brake discs rotatable together with the wheel, the brake device comprising:
   a brake main body supported by a vehicle body or a truck;
   a pair of link arms having support portions between one end portions and the other end portions thereof, the support portions being pivotably supported by the brake main body;
   brake linings supported by the other end portions of the pair of link arms so as to face opposite surfaces of the brake discs, the brake linings being configured to impart frictional forces by coming into sliding contact with the brake discs;
   an actuator configured to be actuated by supply and discharge of working fluid, the actuator being configured to cause the pair of link arms to pivot so as to press the brake linings against the brake discs;
   a coupling member configured to couple the one end portions of the pair of link arms to each other, the coupling member being extendable and contractable; and
   an adjuster configured to cause the coupling member to extend so that positions of the brake linings relative to the brake discs are adjusted to be constant,
   wherein
   the adjuster includes:
      an extension mechanism having a first member and a second member, the extension mechanism being configured to cause the coupling member to extend by relative rotation of the first member and the second member, the first member being non-rotatable and provided with a first screw portion, the second member being rotatable and provided with a second screw portion screwed with the first screw portion;
      a torque transmission portion mounted on an outer circumference of the second member, the torque transmission portion being configured to transmit a rotation torque to the second member only in a direction associated with extension of the extension mechanism; and
      a resistance imparting portion configured to impart resistance to rotation of the second member, and
   the resistance imparting portion includes:
      a sliding contact portion having an end gap, an inner circumference of the sliding contact portion being in sliding contact with the outer circumference of the second member; and
      a biasing member configured to bias the sliding contact portion in a direction of closing of the end gap so as to impart a frictional force to the second member.

2. The brake device according to claim 1,
   wherein
   the adjuster further includes a biasing force adjustment mechanism configured to adjust a biasing force imparted by the biasing member to the sliding contact portion.

3. The brake device according to claim 1, further comprising:
   a link lever pivotably coupled to an output member of the actuator, the link lever being configured to increase and reduce a distance between the one end portions of the pair of link arms by pivoting along with advancement and retraction of the output member,
   wherein
   the adjuster further includes:
      a rotation lever projecting radially outward from the torque transmission portion, and exposed to the outside of the adjuster; and
      a lever biasing member configured to bias the rotation lever in the direction of transmission of the rotation torque from the torque transmission portion to the second member, and
   along with a pivoting motion of the link lever when braking is applied, the rotation lever is pressed by the link levers against a biasing force of the lever biasing member.

* * * * *